(12) United States Patent
Munevar

(10) Patent No.: US 10,480,408 B2
(45) Date of Patent: Nov. 19, 2019

(54) ENERGY WEAPON SYSTEM HAVING A GAS TURBINE GENERATOR WITH IDLE ASSIST

(71) Applicant: Rolls-Royce North American Technologies, Inc., Indianapolis, IN (US)

(72) Inventor: Erik A. Munevar, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 427 days.

(21) Appl. No.: 15/250,436

(22) Filed: Aug. 29, 2016

(65) Prior Publication Data

US 2018/0252161 A1    Sep. 6, 2018

(51) Int. Cl.

| | |
|---|---|
| *F02C 6/14* | (2006.01) |
| *F41H 13/00* | (2006.01) |
| *F02C 9/28* | (2006.01) |
| *F02C 3/10* | (2006.01) |
| *F02C 9/50* | (2006.01) |
| *F01D 15/10* | (2006.01) |
| *F02C 7/32* | (2006.01) |

(52) U.S. Cl.
CPC ............... *F02C 6/14* (2013.01); *F01D 15/10* (2013.01); *F02C 3/10* (2013.01); *F02C 7/32* (2013.01); *F02C 9/28* (2013.01); *F02C 9/50* (2013.01); *F41H 13/005* (2013.01); *F05D 2220/76* (2013.01); *F05D 2260/4031* (2013.01); *F05D 2270/303* (2013.01); *F05D 2270/331* (2013.01)

(58) Field of Classification Search
CPC ........... F05D 2260/207; F05D 2220/50; F05D 2220/76; F05D 2220/323; F05D 2240/35; F05D 2270/05; F05D 2270/06; F25B 2400/24; B60R 16/0215; B60R 16/03; B64D 33/00; B64D 33/08; B64D 33/04; B64D 41/00; B64D 41/007; B64D 2013/0674; B64D 2013/0614; B64D 2221/00; B64D 13/006; B64D 13/08; H01B 9/0605; H01B 7/423; F01D 15/10; F01D 15/08; F02C 9/00; F02C 9/22; F02C 6/08; F02C 6/20; F02C 6/14; F02C 7/12; F02C 7/32; F02C 7/16; F02C 7/141; F02C 7/36; F02C 3/04; F02C 3/10; F02C 9/50; F02C 9/28; F41H 13/0068; F41H 13/005; Y02T 50/675; Y02T 50/44; H02J 4/00; B60L 11/02; B60L 2200/10
USPC ........................................................ 290/1 R
See application file for complete search history.

(56) References Cited

U.S. PATENT DOCUMENTS

| | | |
|---|---|---|
| 3,097,485 A | 7/1963 | Bidwell |
| 3,151,250 A | 9/1964 | Carlson |
| 3,657,881 A | 4/1972 | Rucins et al. |
| 3,826,096 A | 7/1974 | Hrusch |

(Continued)

FOREIGN PATENT DOCUMENTS

GB          723266 A      2/1955

*Primary Examiner* — Mark A Laurenzi
*Assistant Examiner* — Mickey H France
(74) *Attorney, Agent, or Firm* — Barnes & Thornburg LLP

(57) ABSTRACT

A system platform includes a gas turbine engine coupled to a high power generator. The high power generator, driven by the gas turbine engine, supplies power to high power subsystems of the platform.

20 Claims, 3 Drawing Sheets

(56) References Cited

U.S. PATENT DOCUMENTS

| | | | |
|---|---|---|---|
| 4,269,027 A | 5/1981 | Mattson et al. | |
| 4,270,344 A | 6/1981 | Yu | |
| 2006/0225431 A1* | 10/2006 | Kupratis | F01D 15/10 60/791 |
| 2010/0164234 A1* | 7/2010 | Bowman | F02C 7/32 290/1 R |
| 2016/0105030 A1* | 4/2016 | Neuhaus | H02J 3/32 700/298 |

* cited by examiner

ENERGY WEAPON SYSTEM HAVING A GAS TURBINE GENERATOR WITH IDLE ASSIST

FIELD OF THE DISCLOSURE

The present disclosure relates generally to energy weapon systems with gas turbine engines used for power generation.

BACKGROUND

Energy weapons such as lasers, masers, particle accelerators, and the like use energy to create high energy beams. Such weapons can become stand-alone systems when used in conjunction with dedicated power generators. Fuel-burning engines, such as gas turbine engines, can be part of these power generators.

Gas turbine engines are used to power aircraft, watercraft, electrical generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

Gas turbine engines have been used in power generation applications. The engines may sit idle for extended periods of time when excess power is not needed and such idle periods negatively affect engine performance.

SUMMARY

The present disclosure may comprise one or more of the following features and combinations thereof.

According to an aspect of the present disclosure, a weapon system platform may include a high-energy beam unit, a gas turbine engine configured to provide power for the high-energy beam unit, a generator, and an energy storage unit. The high-energy beam unit may be configured to discharge high-energy beams. The gas turbine engine may include a compressor, a combustor, and a turbine. The combustor may be adapted to combine air received from the compressor with fuel and to burn the fuel to supply high pressure gasses toward the turbine to rotate an output shaft of the gas turbine engine. The generator may be coupled to the output shaft of the gas turbine engine and may be adapted to generate electricity when driven by the gas turbine engine. The energy storage unit may be coupled to the generator and may be configured to store the electricity generated by the generator.

In illustrative embodiments, the gas turbine engine may be adapted to operate between an idling output level and a main power generation output level higher than the idling output level. A load applicator may be coupled to the gas turbine engine. A system controller may be configured to selectively operate the load applicator to apply a load on the gas turbine engine to increase an output level of the gas turbine engine above the idling output level and below the main power generation output level to cause an increase in an exhaust temperature of the gas turbine engine.

In illustrative embodiments, the system controller may be further configured to selectively increase the output of the gas turbine engine when an amount of electricity stored in the energy storage unit is below a threshold level.

In illustrative embodiments, the load applicator may be coupled to the energy storage unit and may be configured to draw electricity from the energy storage unit.

In illustrative embodiments, the load applicator may be configured to engage with a rotating component of the gas turbine engine to resist rotation of the rotating component.

In illustrative embodiments, a load shaft gearbox may be coupled to the output shaft and the generator. The load shaft gearbox may be configured to transfer rotation of the output shaft to the generator.

In illustrative embodiments, the energy storage unit may be a high power energy storage unit configured to power the high-energy beam unit. The generator may be a high power generator configured to produce electricity to charge the high power energy storage unit during operation of the high-energy beam unit.

In illustrative embodiments, the output of the gas turbine engine may be selectively increased when the high-energy beam unit is operated.

In illustrative embodiments, a low power generator may be coupled to the load shaft gearbox and may be configured to generate electricity when driven by the gas turbine engine. A low power energy storage unit may be coupled to the low power generator and may be configured to store the electricity generated by the low power generator.

In illustrative embodiments, the load applicator may be coupled to the low power energy storage unit.

According to another aspect of the present disclosure, a method of operating a weapon system platform may include rotating a generator with a gas turbine engine to produce electricity, storing the electricity produced by the generator in an energy storage unit, and selectively providing electricity from the energy storage unit to a high-energy beam unit to cause an energized beam to be discharged.

In illustrative embodiments, the gas turbine engine may be adapted to operate between an idling output level and a main power generation output level higher than the idling output level. The method may further include selectively applying a load on the gas turbine engine with a load applicator to increase an output level of the gas turbine engine above the idling output level and below the main power generation output level to cause an increase in an exhaust temperature of the gas turbine engine.

In illustrative embodiments, the output of the gas turbine engine may be selectively increased when an amount of electricity stored in the energy storage unit is below a threshold level.

In illustrative embodiments, the load applicator may be coupled to the energy storage unit and may be configured to draw electricity from the energy storage unit.

In illustrative embodiments, the load applicator may be configured to engage with a rotating component of the gas turbine engine to resist rotation of the rotating component.

In illustrative embodiments, the load applicator may be coupled to the energy storage unit and may be configured to draw electricity from the energy storage unit.

In illustrative embodiments, a load shaft gearbox may be coupled to the output shaft and the generator. The load shaft gearbox may be configured to transfer rotation of the output shaft to the generator.

In illustrative embodiments, the energy storage unit may be a high power energy storage unit configured to power the high-energy beam unit. The generator may be a high power generator configured to produce electricity to charge the high power energy storage unit during operation of the high-energy beam unit.

In illustrative embodiments, the output of the gas turbine engine may be selectively increased when the high-energy beam unit is operated.

In illustrative embodiments, a low power generator may be coupled to the load shaft gearbox and may be configured to generate electricity when driven by the gas turbine engine. A low power energy storage unit may be coupled to the low power generator and may be configured to store the electricity generated by the low power generator.

In illustrative embodiments, the load applicator may be coupled to the low power energy storage unit.

These and other features of the present disclosure will become more apparent from the following description of the illustrative embodiments.

DETAILED DESCRIPTION OF THE DRAWINGS

Figure 1:
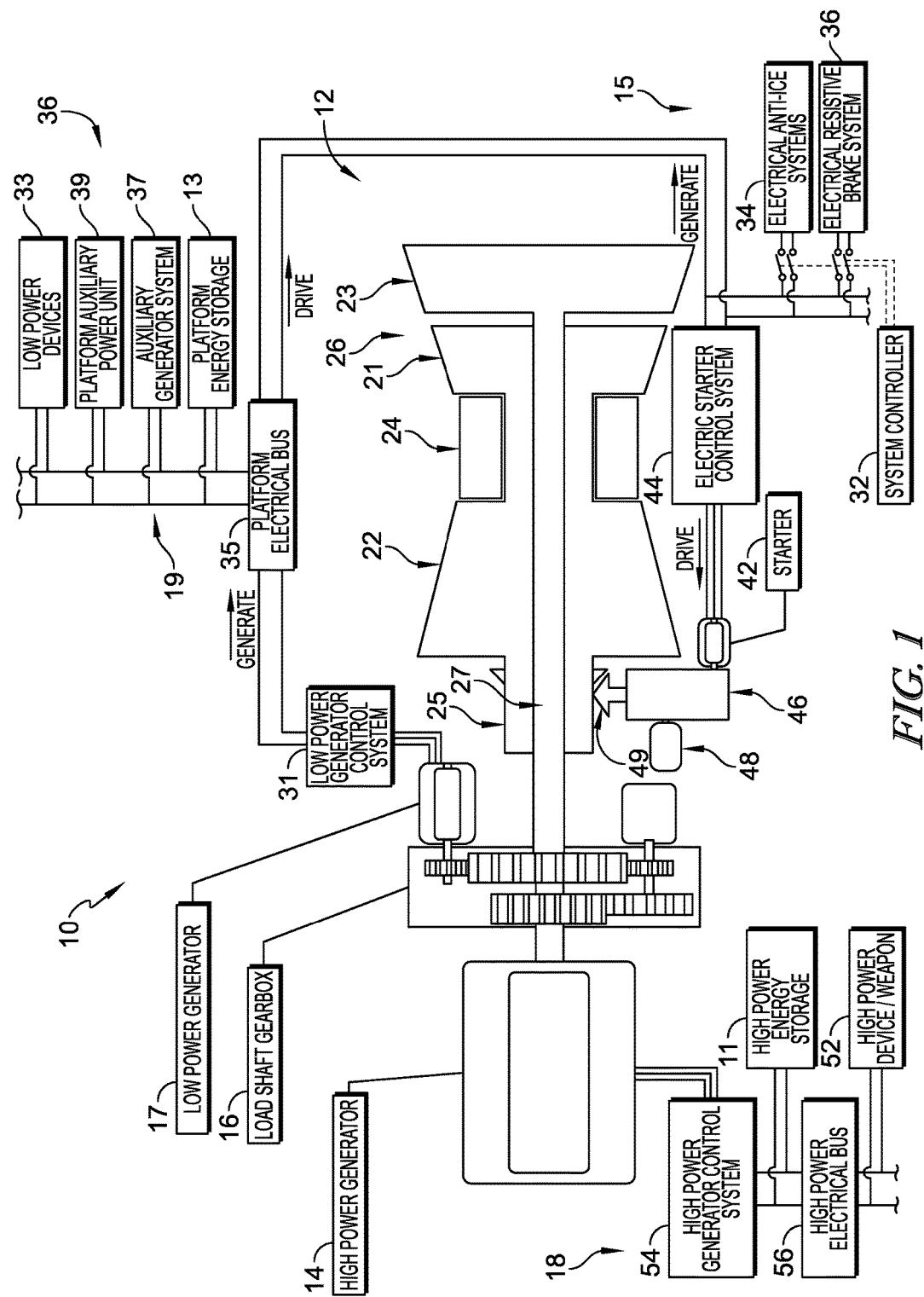
FIG. 1 is a is a diagrammatic view of an energy weapon system platform having a gas turbine engine used to drive a generator for producing power to be stored for later use and suggesting that a load can be applied to the engine by the platform subsystems to increase an idle speed of the engine in order to generate the power needed by the activated subsystems.

For the purposes of promoting an understanding of the principles of the disclosure, reference will now be made to a number of illustrative embodiments illustrated in the drawings and specific language will be used to describe the same.

An energy weapon system platform 10 with a gas turbine engine 12 is shown, partially diagrammatically, in FIG. 1. The system platform 10 includes a high power device or weapon 52 that produces high energy beams using power generated by the gas turbine engine 12. In illustrative embodiments, the high power device 52 may be a high-energy beam unit, such as a laser, maser, particle accelerator, or the like so that a stand-alone energy weapon system is provided. In other embodiments, the system platform 10 may include non-weaponized high power devices 52 without departing from the spirit of this disclosure.

As shown in FIG. 1, the illustrative system platform 10 includes the gas turbine engine 12 coupled to a high power generator 14 by a load shaft gearbox 16. The high power generator 14 supplies power to high power subsystems 18 of the platform 10. A low power generator 17 is also coupled to load shaft gearbox 16 to provide power for low power subsystems 19 of the platform 10. The gas turbine engine 12 drives the gearbox 16 to turn the high power and low power generators 14, 17 to produce electricity for the platform 10. The produced electricity can be stored in energy storage units 11, 13 for later use. During extended idle periods of the engine 12, load applicators 15 can be activated to place an electrical load on the system, or mechanical load on the engine 12, to increase the operating output and temperature of the engine 12.

The gas turbine engine 12 includes a compressor 22, a combustor 24, and a turbine 26 having a high pressure (HP) turbine rotor 21 and a low pressure (LP) turbine rotor 23 as shown in FIG. 1. Air is drawn into the compressor 22 which compresses and delivers the air to the combustor 24. The combustor 24 mixes fuel with the compressed air from the compressor 22 and combusts the mixture. The hot, high-pressure exhaust products of the combustion reaction in the combustor 24 are directed into the turbine 26 to cause rotation of the HP and LP turbine rotors 21, 23.

The compressor 22 and HP turbine rotor 21 are connected to a high pressure (HP) shaft 25 and rotate together as suggested in FIG. 1. The LP turbine rotor 23 is coupled to a low pressure (LP) shaft 27 which rotate together. The HP and LP shafts 25, 27 are rotatable independent of one another. The compressor 22, combustor 24, and HP turbine rotor 21 cooperate to run the gas turbine engine 12 while the hot, high-pressure exhaust products from the combustor 24 rotate the LP turbine rotor 23 and LP shaft 27 to drive the generators 14, 17.

A low power generator control system 31 is used to monitor the platform energy storage unit 13 and other low power subsystems 19 of the platform 10 as suggested in FIG. 1. In the illustrative embodiment, a platform electrical bus 35 connects low power devices 33 of the platform 10, such as sensors and communication devices, with the platform energy storage unit 13 to supply energy for the low power devices 33. Low power generator control system 31 can control operation of the engine 12 to maintain a level of stored energy in the platform energy storage unit 13 above a threshold level and to supply power during operation of the low power device 33. The low power generator 17 supplies energy to the platform energy storage unit 13 during operation of the engine 12.

The engine 12 can be brought to an idle where the amount of fuel and rotational speed of the engine 12 are reduced to conserve fuel when power generation is not needed as suggested in FIG. 1. During extended periods of idling by the engine 12, particulate matter can build up and deposit in the exhaust of the engine 12 due to insufficient exhaust temperatures. In the illustrative embodiment, a system controller 32 is configured to selectively operate the load applicators 15 to increase the output of the engine 12 and raise the temperature of the exhaust so that particulate deposits are minimized.

Load applicators 15 can include devices which apply electrical load on the platform 10, apply mechanical load on the engine 12, or combinations thereof, as suggested in FIG. 1. One example of an electrical load applicator 15 is an electrical anti-ice system 34 which, when operated, pulls energy from the platform energy storage 13. The output of the engine 12 is increased to increase the output of the low power generator 17 to maintain the platform energy storage 13 above a threshold level. One example of a mechanical load applicator 15 is an electrical resistive brake system 36 which, when activated, engages with a rotating component of the engine 12 to resist rotation of the engine 12. The output of the engine 12 is increased to overcome the added resistance of the brake system 36. The brake system 36 can also use power from the platform energy storage 13 so that the output of the engine 12 is increased to increase the output of the low power generator 17 to maintain the platform energy storage 13 above a threshold level.

To initially start the engine 12, a starter 42 of the engine 12 is controlled by an electric starter control system 44 as suggested in FIG. 1. The starter 42 is configured to rotate the HP shaft 25 and start the engine 12 by pre-compressing air for combustion in the combustion chamber 24 during "light-off." In the illustrative embodiment, the starter 42 is coupled to an accessory gearbox 46 which engages with the 4P shaft 25 through a bevel gear 49. One or more additional engine accessories 48 can be connected to the accessory gearbox 46, such as oil pumps for example, to run the accessories during starting of the engine 12 and while the engine 12 is running. One or more additional engine accessories 48 can also be connected to the load shaft gearbox 16. Starter 42 is driven by engine 12 to supply energy to various components of the engine 12. Alternatively or in combination with the starter 42, the low power generator 17 can supply energy to the engine 12 components.

Figure 3:
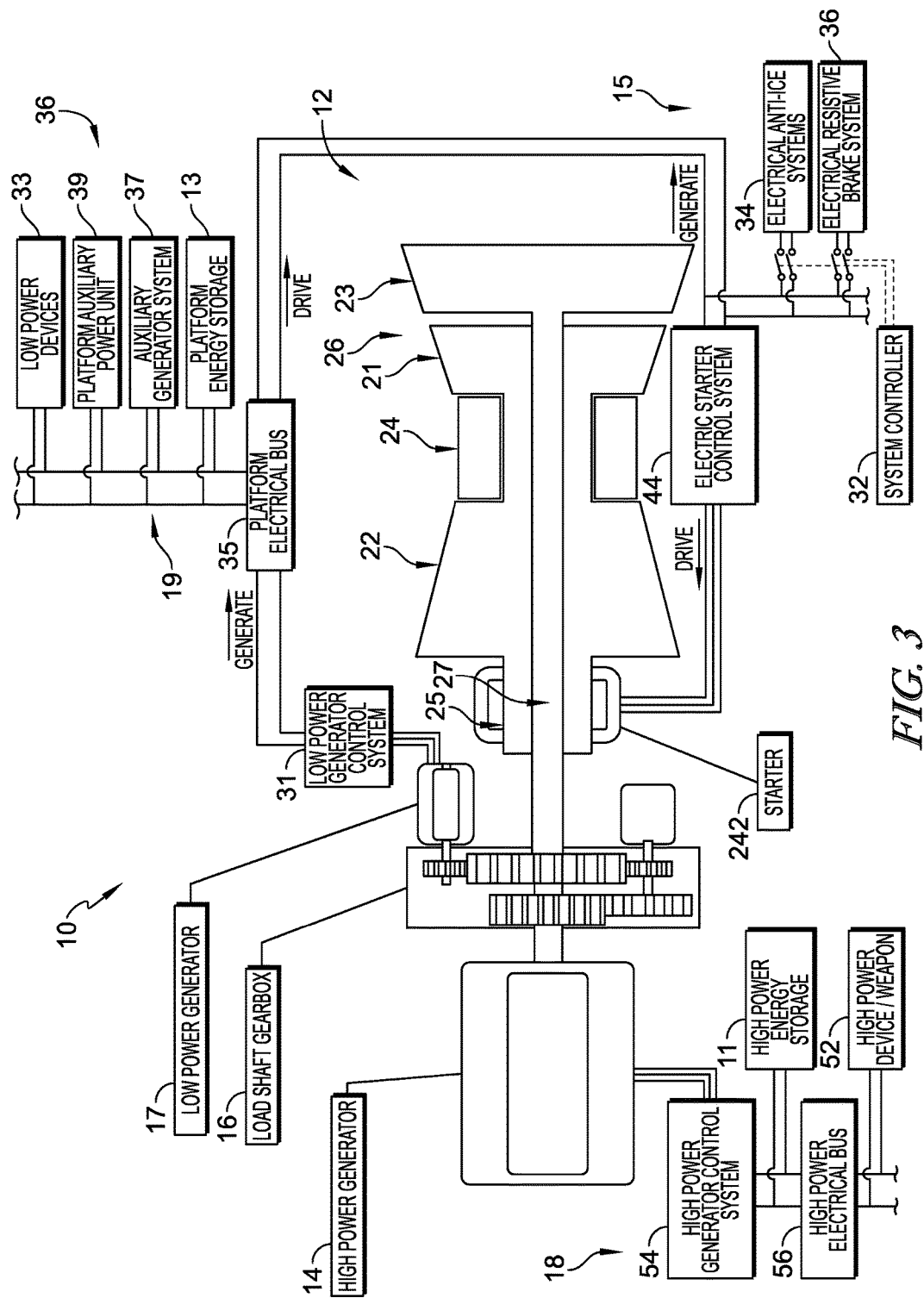
FIG. 3 is a view similar to FIG. 1 showing a starter of the engine integrated with a shaft of the engine.

In some embodiments, a starter 242 is integrated with the HP shaft 25 as suggested in FIG. 3. The starter 242 is used to start the engine 12 and acts as a generator while the engine 12 is running similar to the starter 42 of FIG. 1. In some embodiments, rotor components of the starter 242, such as magnets or rotor windings, are integrated with the HP shaft 25.

A high power generator control system 54 is used to monitor the high power energy storage unit 11 and a high power weapon or device 52 as suggested in FIG. 1. Energy stored in the high power energy storage unit 11 is supplied through a high power electrical bus 56 to the high power device 52 or other high power needs of the platform 10. High power generator control system 54 can control operation of the engine 12 to maintain a level of stored energy in the high power energy storage unit 11 above a threshold level and to supply power during operation of the high power device 52. In some embodiments, the high power energy storage unit 11 is a battery, capacitor, other energy storage device, or combination thereof.

In some embodiments, external energy sources 36 are used to maintain a threshold level of power in the platform energy storage unit 13 as suggested in FIG. 1. External energy sources can include an auxiliary generator system 37, such as an internal combustion engine powered generator or another gas turbine engine powered generator, and to a platform auxiliary power unit 39, such as a local power grid, for example. In some embodiments, platform 10 is stationary and is coupled the platform auxiliary power unit 39. The platform auxiliary power unit 39 can be used to maintain a threshold level of power in both energy storage units 11, 13 during idle of the engine 12. In some embodiments, the platform 10 is designed to be a self-sustaining unit which can operate independent of a local power grid or other external power source so long as fuel is supplied to the engine 12. The auxiliary generator system 37 can be used to maintain a threshold level of power in both energy storage units 11, 13 during idle of the engine 12.

Figure 2:
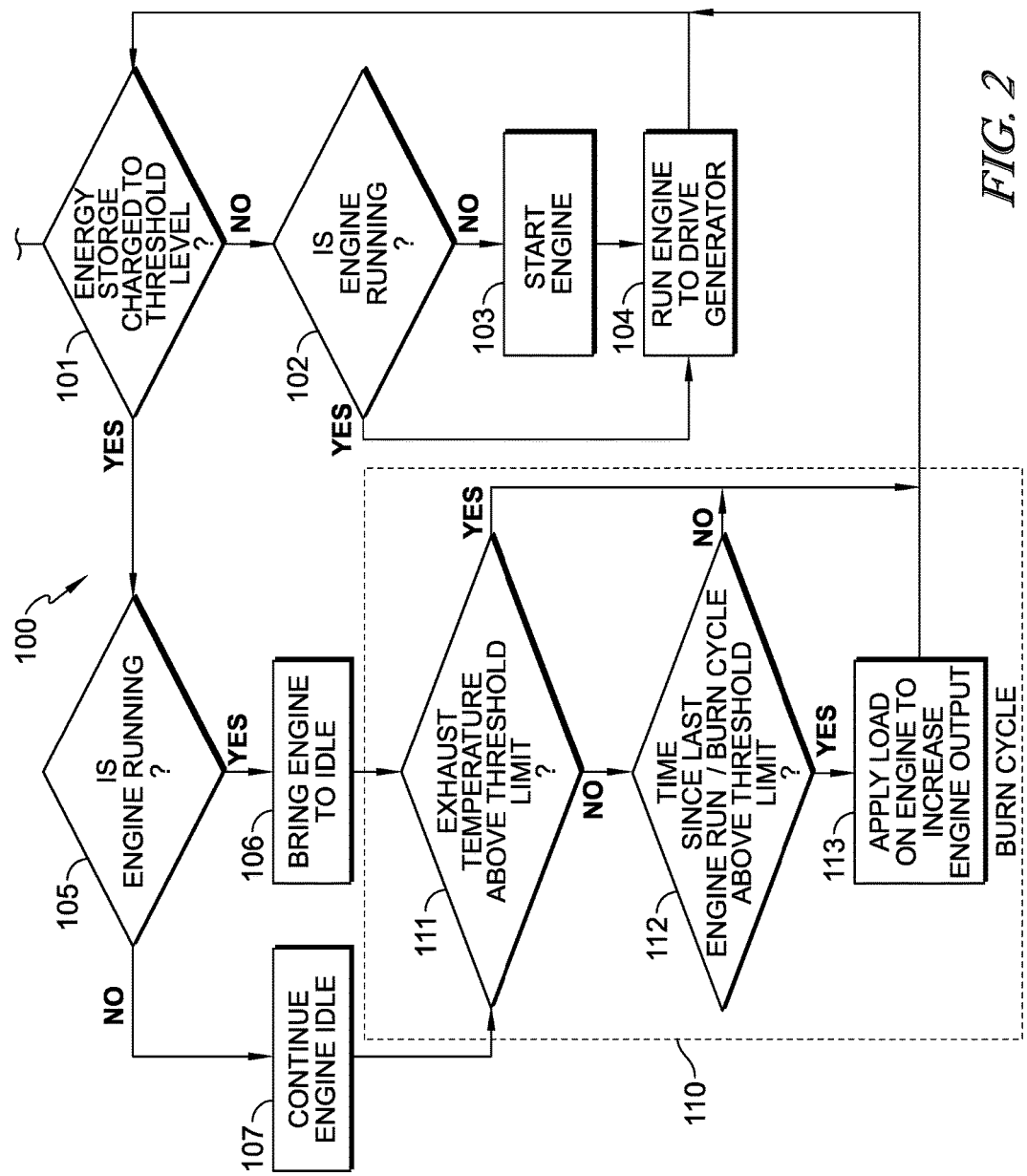
FIG. 2 is a diagrammatic view of a process for extended-idle operation of the gas turbine engine of FIG. 1 showing that the engine goes through a burn cycle when the engine is brought to idle after a threshold amount of energy is stored for the platform.

An illustrative process 100 for operating the platform 10 in accordance with the present disclosure is shown in FIG. 2. The process starts at 101, at which a check of energy storage levels is conducted to determine if they are above a threshold level. In some embodiments, the threshold energy storage level is based on the performance characteristics of the energy storage units 11, 13, the power requirements of the high power device 52 and other high power subsystems 18 of platform 10, the power requirements of the low power devices 33 and other low power subsystems 19 of platform 10, the availability of an auxiliary generator system 37, and the availability of a platform auxiliary unit 39. If there is not an amount of energy stored above the threshold level, a check of whether the gas turbine engine 12 used to drive the high power generator 14 is running or not is conducted as suggested at 102. If the engine 12 is not already running, fuel is supplied to the engine 12 to start the engine as suggested at 103, and the engine 12 drives the high power generator 14 to supply power to the energy storage units 11, 13 as suggested at 104.

When a threshold level of energy storage is reached, a check of whether the gas turbine engine 12 used to drive the high power generator 14 is running or not is conducted as suggested at 105 in FIG. 2. If the engine 12 is running, the engine 12 is brought to an idle as suggested at 106, or the engine 12 continues to idle if it was not running as suggested at 107. Idling of the engine 12 continuously drives the generators 14, 17 to provide power to energy storage units 11, 13.

Particulate buildup can occur during extended periods of idling of the engine 12 where exhaust temperatures are reduced. A burn cycle 110 is used to minimize particulate formation in the engine 12. If a temperature of the exhaust of the engine 12 is below a threshold level, a check of when the gas turbine engine 12 was last run or when the last burn cycle 110 occurred is conducted as suggested at 111-112 in FIG. 2. If the time from the last run of the engine 12 or last burn cycle 110 is above a threshold limit, a load is applied by the load applicators 15 to increase output of the engine 12 to increase the exhaust temperature above the threshold limit as suggested at 112-113.

In gas turbine engines (such as engine 12), mechanical power is transferred from turbines (such as turbine 26) to compressors (such as compressor 22) through shaft and spline systems (such as HP and LP shafts 25, 27), with bearings providing axial and radial positioning of the rotating components. A central shaft (which may be referred to as a "main" shaft, a "main drive," or a "mainline" shaft, for example) typically links the turbine 26 and compressor sections 22 of the turbine engine 12. In turbine engines 12 having multiple turbine 21, 23 and compressor sections 22, there may be multiple, concentric, independently rotatable shafts 25, 27. For example, a high pressure (HP) shaft 25 may link a high pressure compressor 22 with a high pressure turbine 21, while a low pressure (LP) shaft 27 links a fan or other mechanical output, such as a "main" generator 17, with a low pressure turbine 23. The low pressure shaft 27 may be concentric with and disposed within the high pressure shaft 25.

During operation, the gas turbine engine 12 drives a generator 17 to supply power for accessories and subsystems 18 of the associated platform 10. Typical engine accessories (i.e., 48) include an engine control unit, a starter 42, fuel pumps, oil pumps, etc. In order to extract power from the turbine engine 12 to drive these accessories and subsystems, one or more mechanical or electrical "accessory" drives (i.e., 46) transmit power from the mainline shafts to a starter 42 of the engine 12. The starter 42 is used to turn the engine 12 when activated, such as when starting the engine, and generate power when idle. For example, a bevel gear 49, alone or in combination with other components (such as a stub shaft, idler, spur gears and splines), may be driven by a mainline shaft (i.e., 25). The bevel gear 49 may drive an accessory gearbox 46, which in turn rotates the starter 42 to provide power to the engine accessories 48.

The system platform 10 is generally a self-contained unit which can operate without input from external power sources if needed. In some embodiments, the platform 10 is a stationary unit which can be integrated with a power grid such that the gas turbine engine generator is only needed during outages of the power grid. In some embodiments, the platform 10 is a mobile unit which can be integrated into an air, land, or water based vehicle, for example. The vehicle generally includes a main drive used to power and move the vehicle, and the gas turbine engine generator is used to power various subsystems requiring additional power.

In illustrative embodiments, the system platform 10 of the present disclosure is used for operating a high power weapon or other device 52 which consumes large amounts of electricity on-demand. One example is a directed energy weapon, such as a laser. The high power device 52 is connected to energy storage units 11 of the platform 10 which are maintained by the gas turbine engine generator with a threshold amount of power to operate the high power device 52. For example, the energy storage units 11 can include sufficient capacity for short-term, continued operation of the high power device 52, or multiple pulsed operations before being depleted. The gas turbine generator is used to resupply the energy storage units 11 to allow further use of the high power device 52.

The gas turbine engine generator can be placed in an "idle" state during extended periods of non-use of the high power device 52. The gas turbine engine generator cycles on and off to maintain the energy storage units 11, 13 above a threshold level. However, due to the extended durations of idle by the engine, particulate deposits may form in the engine's 12 exhaust due to temperature drops. The heavy fuels used to operate gas turbine engines 12 can produce particulate matter if not burned and exhausted at a high enough temperature.

In illustrative embodiments of the present disclosure, the gas turbine engine 12 is brought to an idle when there is a supply of stored energy above a threshold level. The idling engine 12 is run through a burn cycle 110 where load is applied to the engine 12 if the exhaust temperature of the engine exhaust is not above a threshold level sufficient to minimize particulate formation and buildup. The burn cycle 110 reduces maintenance and repair costs of the engine 12 and allows for extended operation of the platform 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A weapon system platform comprising
a high-energy beam unit configured to discharge high-energy beams,
a gas turbine engine configured to provide power for the high-energy beam unit, the gas turbine engine including a compressor, a combustor, and a turbine, the combustor adapted to combine air received from the compressor with fuel and to burn the fuel to supply high pressure gasses toward the turbine to rotate an output shaft of the gas turbine engine, the gas turbine engine adapted to operate between an idling output level and a main power generation output level higher than the idling output level,
a generator coupled to the output shaft of the gas turbine engine and adapted to generate electricity when driven by the gas turbine engine,
an energy storage unit coupled to the generator and configured to store the electricity generated by the generator,
a load applicator coupled to the gas turbine engine and configured to apply at least one of an electrical load on the energy storage unit and a mechanical load on the gas turbine engine, and
a system controller configured to selectively operate the load applicator to increase an output level of the gas turbine engine above the idling output level and below the main power generation output level to cause an increase in an exhaust temperature of the gas turbine engine when the exhaust temperature is below a threshold level.

2. The system platform of claim 1, wherein the system controller is further configured to selectively increase the output of the gas turbine engine when an amount of electricity stored in the energy storage unit is below a threshold level.

3. The system platform of claim 2, wherein the load applicator is coupled to the energy storage unit and is configured to draw electricity from the energy storage unit.

4. A weapon system platform comprising
a high-energy beam unit configured to discharge high-energy beams,
a gas turbine engine configured to provide power for the high-energy beam unit, the gas turbine engine including a compressor, a combustor, and a turbine, the combustor adapted to combine air received from the compressor with fuel and to burn the fuel to supply high pressure gasses toward the turbine to rotate an output shaft of the gas turbine engine,
a generator coupled to the output shaft of the gas turbine engine and adapted to generate electricity when driven by the gas turbine engine,
an energy storage unit coupled to the generator and configured to store the electricity generated by the generator,
a load applicator coupled to the gas turbine engine, and
a system controller configured to selectively operate the load applicator to apply a load on the gas turbine engine to increase an output level of the gas turbine engine to cause an increase in an exhaust temperature of the gas turbine engine,
wherein the load applicator is configured to engage with a rotating component of the gas turbine engine to resist rotation of the rotating component.

5. The system platform of claim 2, wherein the load applicator is coupled to the energy storage unit and is configured to draw electricity from the energy storage unit.

6. The system platform of claim 1, further comprising a load shaft gearbox coupled to the output shaft and the generator, wherein the load shaft gearbox is configured to transfer rotation of the output shaft to the generator.

7. The system platform of claim 6, wherein the energy storage unit is a high power energy storage unit configured to power the high-energy beam unit, and wherein the generator is a high power generator configured to produce electricity to charge the high power energy storage unit during operation of the high-energy beam unit.

8. The system platform of claim 7, wherein the output of the gas turbine engine is selectively increased when the high-energy beam unit is operated.

9. The system platform of claim 7, further comprising a low power generator coupled to the load shaft gearbox and configured to generate electricity when driven by the gas turbine engine, and a low power energy storage unit coupled to the low power generator and configured to store the electricity generated by the low power generator.

10. The system platform of claim 9, wherein the load applicator is coupled to the low power energy storage unit.

11. A method of operating a weapon system platform, the method comprising
- rotating a generator with a gas turbine engine to produce electricity, the gas turbine engine adapted to operate between an idling output level and a main power generation output level higher than the idling output level,
- storing the electricity produced by the generator in an energy storage unit,
- selectively providing electricity from the energy storage unit to a high-energy beam unit to cause an energized beam to be discharged, and
- selectively applying at least one of an electrical load on the energy storage unit and a mechanical load on the gas turbine engine with a load applicator to increase an output level of the gas turbine engine above the idling output level and below the main power generation output level to cause an increase in an exhaust temperature of the gas turbine engine when the exhaust temperature is below a threshold level.

12. The method of claim 11, wherein the output of the gas turbine engine is selectively increased when an amount of electricity stored in the energy storage unit is below a threshold level.

13. The method of claim 12, wherein the load applicator is coupled to the energy storage unit and is configured to draw electricity from the energy storage unit.

14. The method of claim 12, wherein the load applicator is configured to engage with a rotating component of the gas turbine engine to resist rotation of the rotating component.

15. The method of claim 14, wherein the load applicator is coupled to the energy storage unit and is configured to draw electricity from the energy storage unit.

16. The method of claim 11, wherein a load shaft gearbox is coupled to the output shaft and the generator, and wherein the load shaft gearbox is configured to transfer rotation of the output shaft to the generator.

17. The method of claim 16, wherein the energy storage unit is a high power energy storage unit configured to power the high-energy beam unit, and wherein the generator is a high power generator configured to produce electricity to charge the high power energy storage unit during operation of the high-energy beam unit.

18. The method of claim 17, wherein the output of the gas turbine engine is selectively increased when the high-energy beam unit is operated.

19. The method of claim 17, wherein a low power generator is coupled to the load shaft gearbox and configured to generate electricity when driven by the gas turbine engine, and wherein a low power energy storage unit is coupled to the low power generator and configured to store the electricity generated by the low power generator.

20. The method of claim 19, wherein the load applicator is coupled to the low power energy storage unit.

* * * * *